(12) United States Patent
Miura et al.

(10) Patent No.: US 6,907,059 B1
(45) Date of Patent: Jun. 14, 2005

(54) OPTICAL COMPONENT FIXING METHOD AND OPTICAL COMPONENT SUPPORT

(75) Inventors: Hideo Miura, Kaisei-machi (JP); Kazumi Kubo, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/534,034

(22) Filed: Mar. 24, 2000

(30) Foreign Application Priority Data

Mar. 25, 1999 (JP) .......................................... 11-081945

(51) Int. Cl.⁷ .......................... H01S 3/08; B32B 17/00; B32B 31/00; C03C 27/00
(52) U.S. Cl. .......................... 372/98; 372/99; 372/100; 372/101; 372/107; 156/101; 156/257
(58) Field of Search .......................... 372/98, 99, 100, 372/101, 107, 109, 43, 36, 70, 71, 72, 92, 95; 156/101, 257; 257/98

(56) References Cited

U.S. PATENT DOCUMENTS

| | | | | |
|---|---|---|---|---|
| 5,669,997 A | * | 9/1997 | Robbert et al. | 156/101 |
| 5,703,900 A | * | 12/1997 | Nozaki et al. | 372/107 |
| 6,670,222 B1 | * | 12/2003 | Brodsky | 438/118 |
| 2001/0053167 A1 | * | 12/2001 | Kitaoka et al. | 372/43 |

* cited by examiner

Primary Examiner—Minsun Harvey
Assistant Examiner—Armando Rodriguez
(74) Attorney, Agent, or Firm—Sughrue Mion, PLLC

(57) ABSTRACT

A method of fixing an optical component includes the steps of scoring a surface of a support, bringing an optical component into close contact with the scored surface of the support, and flowing a fluid adhesive along kerfs produced by the scoring. An optical component support has a surface provided with scoring kerts for fixing the optical component. The method and support enable fixing of an optical component by a thin, uniform adhesive layer, without fine polishing of the optical component and the surface of the support.

9 Claims, 2 Drawing Sheets

F I G . 1
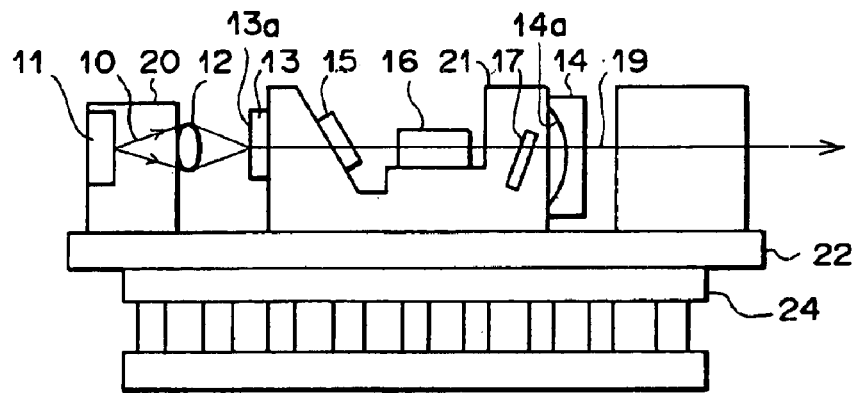
F I G . 2
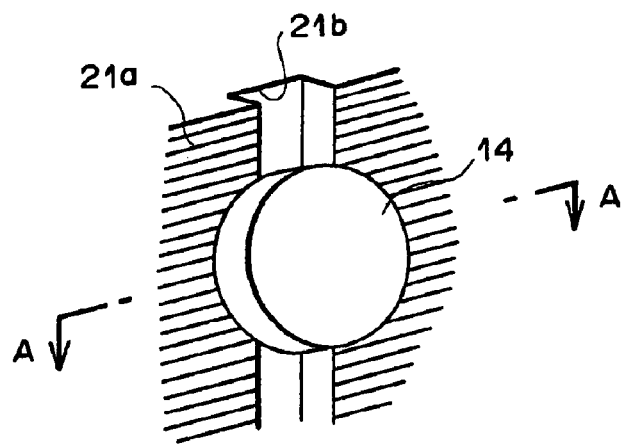
F I G . 3
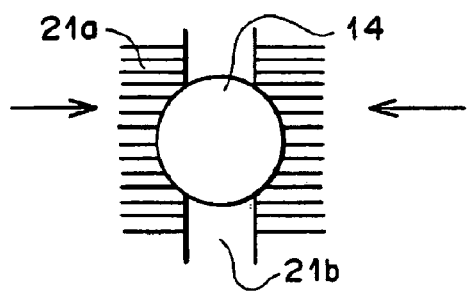

OPTICAL COMPONENT FIXING METHOD AND OPTICAL COMPONENT SUPPORT

BACKGROUND OF THE INVENTION

1. Field of the Invention

The present invention relates to an optical component fixing method and an optical component support for use in an optical apparatus equipped with at least one optical component and optical component support, particularly to a fixing method used when an optical component is fixed to a support by an adhesive and the support to which the optical component is fixed.

2. Description of the Related Art

In order to ensure stable laser emission, the length of the laser resonator must be kept from varying greatly with change in ambient temperature. This is achieved, for example, by temperature-controlling the resonator section. When the layer of adhesive between a resonator mirror and the retaining member is thick, however, thermal stress is produced by the difference in thermal expansion coefficient between the retaining member and the mirror. Since this increases the adhesive contraction during hardening, the resonator length cannot be kept constant. Change in the resonator length causes fluctuation in the laser output and the longitudinal mode and/or induces noise. Stable lasing cannot be maintained under these conditions change in resonator length therefore must be held to within ¼ of the wavelength of the laser light. Considering the fact that many semiconductor-laser-pumped solid state lasers emit light of a wavelength around 1 $\mu$m, change in resonator length should ideally be kept under around 0.25 $\mu$m.

Applicant's Japanese Unexamined Patent Publication No. 8(1996)-186308 teaches a Fabry-Perot resonator that has its resonator mirrors adhered to opposite ends of the resonator retaining member and that is enabled to maintain a constant resonator length by keeping the thickness of the adhesive layers at not greater than 5 $\mu$m and the roughness of the machined surface of the retaining member at not greater than the wavelength of the laser light. In an optical apparatus that, like this semiconductor-laser-pumped solid state laser, requires precise positional adjustment and fixing of an optical component, the fixing of the optical component by use of a fluid adhesive must be carried out by uniformly flowing the adhesive between the optical component and its support. To ensure formation of a uniform adhesive layer, therefore, the practice is to facilitate the flow of the adhesive by finely polishing the attachment surfaces of the optical component and the support.

However, the fine polishing of the attachment surfaces of the optical component and support involves considerable cost and is therefore economically disadvantageous.

SUMMARY OF THE INVENTION

The present invention was accomplished in light of the foregoing circumstances and has as an object to provide a method for fixing an optical component and a support by a uniform adhesive layer formed by flowing an adhesive between the optical component and the support, without need for finely polishing the attachment surfaces of the optical component and support.

The method of fixing an optical component according to the present invention comprises the steps of scoring a surface of a support, bringing an optical component into close contact with the scored surface of the support, and flowing a fluid adhesive along kerfs produced by the scoring.

By "flowing a fluid adhesive along kerfs produced by the scoring" is meant bringing the scored surface of the support and the optical component into close contact and allowing the fluid adhesive to seep along the kerfs by capillarity. By "adhesive" is meant any of various substances widely used to join two objects of the same or different types, including thermosetting adhesives composed of synthetic resins as well as other substances used for bonding such as solders, e.g., tin-lead alloy, and the like.

The pitch of the scoring kerfs is preferably 3 $\mu$m–300 $\mu$m. At less than 3 $\mu$m, the scoring requires much time. At greater than 300 $\mu$m, deep inflow of the adhesive by capillarity is hard to achieve. The depth of the scoring kerfs is preferably 0.1 $\mu$m–1 $\mu$m. Scoring kerfs of a depth of less than 0.1 $\mu$m are difficult to form for technical reasons. A thin adhesive layer is hard to form when the depth of the scoring kerfs is greater than 1 $\mu$m. Making the depth of the kerfs greater than 1 $\mu$m is particularly disadvantageous in the case of a semiconductor-laser-pumped solid state laser because it becomes difficult to reliably realize an adhesive layer thickness of 5 $\mu$m or less as is necessary to ensure that the contraction during adhesive hardening does not affect the resonator length. The scoring tool used to effect the scoring, the relative motion between the blade and the scored object, the scoring technique (e.g., high-temperature scoring or low-temperature scoring) must be capable of conducting the scoring described in the foregoing but are otherwise not particularly limited. The scoring can, for example, be effected by a rotating blade.

The flatness of the attachment surface of the support is preferably 1 $\mu$or less, more preferably 0.3 $\mu$m or less. When the flatness of the support is greater than this, the adhesive layer thickness cannot easily be kept at the aforesaid value of 5 $\mu$m or less. By "flatness" is meant the fineness, including burrs, of the support attachment surface. The magnitude of the flatness is expressed as deviation of the surface from the reference surface owing to surface roughness, undulation, inclination or the like.

The optical component fixing method according to the present invention, i.e., the invention method of using an adhesive to fix an optical component and a support on which the optical component is to be fixed at a prescribed location, can be utilized in the case where the optical component is a component of a solid state laser apparatus, e.g., where it is a resonator mirror or other such component to be fixed on the support.

The invention support on which the optical component is fixed is characterized in that the surface thereof on which the optical component is fixed is provided with kerfs by scoring. The scoring kerfs are provided on the surface of the support at least at the portion thereof where the optical component is fixed.

The present invention provides a method of using an adhesive to fix an optical component and a support on which the optical component is to be fixed at a prescribed location. As the invention method comprises the steps of scoring a surface of the support, bringing the optical component into close contact with the scored surface, and flowing a fluid adhesive along kerfs produced by the scoring, it enables the adhesive to penetrate uniformly between the surfaces of the support and the optical component.

This effect of the invention is enhanced and the thickness of the adhesive layer can be minimized by forming the scoring kerfs to have a pitch of 3 $\mu$m–300 $\mu$m and a depth of 0.1 $\mu$m and forming the attachment surface of the support to have a flatness of 1 $\mu$m or less.

When the optical component is a component of a solid state laser apparatus, the aforesaid scoring of the support on which the optical component is fixed enables the adhesive layer joining the optical component and the support to be formed to a thickness at which the contraction during adhesive hardening does not affect the resonator length, even if the attachment surface is not finely polished.

BRIEF DESCRIPTION OF THE DRAWINGS

FIG. 1 is a schematic side view showing the overall configuration of a semiconductor-laser-pumped solid state laser in accordance with an embodiment of the present invention, FIG. 2 is an enlarged perspective view of the attachment section between a resonator mirror 14 and a holder 21 in accordance with an embodiment of the present invention, FIG. 3 is a front view of the attachment section shown in FIG. 2.

DESCRIPTION OF THE PREFERRED EMBODIMENTS

Preferred embodiments of the present invention will now be explained in detail with reference to the accompanying drawings.

Figure 4:
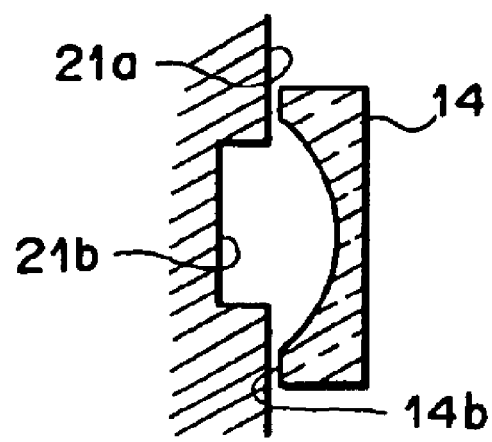
FIG. 4 is a sectional view taken along line A—A in FIG. 2.

FIG. 1 shows a semiconductor-laser-pumped solid state laser in accordance with an embodiment of the present invention, FIG. 2 is an enlarged perspective view of the attachment section between a resonator mirror 14 and a holder 21 in accordance with an embodiment of the present invention, FIG. 3 is a front view of the attachment section shown in FIG. 2, and FIG. 4 is a sectional view taken along line A—A in FIG. 2. The semiconductor-laser-pumped solid state laser includes a semiconductor laser 11, constituted as a chip, that emits a laser beam used as optical pumping light, a condenser lens 12 for condensing the laser beam 10 (which consists of divergent light), a YAG crystal 12 (a solid state laser medium doped with neodymium (Nd); hereinafter called Nd:YAG crystal 12), and a resonator mirror 14 disposed on the front side (right side in the drawing) of the Nd:YAG crystal 13. A Brewster plate 15, a $KNbO_3$ crystal 16 (a nonlinear optical material; hereinafter called KN crystal 16) and an etalon 17 consisting of a quartz plate are disposed between the resonator mirror 14 and the Nd:YAG crystal 13 in the order mentioned from the side of the Nd:YAG crystal 13.

The semiconductor laser 11 emits a laser beam 10 of 809 nm wavelength. The laser beam 10 enters the Nd:YAG crystal 13 where it excites niobium ions to emit light of 946 nm wavelength. The end face 13a of the Nd:YAG crystal 13 through which the pumping light enters is covered with a coating that efficiently reflects light of 946 nm wavelength (reflectance not less than 99.9%) and efficiently transmits the 809 nm-wavelength pumping laser beam 10 (transmittance not less than 99%). The mirror surface 14a of the quartz resonator mirror 14 is covered with a coating that efficiently reflects 946 nm-wavelength light and transmits 473 nm-wavelength light.

The 946 nm-wavelength light is therefore trapped between the surfaces 13a and 14a to produce lasing and the resulting laser beam is converted to ½ its wavelength, i.e., to the second harmonic 19 of 473 nm wavelength, by the KN crystal 16, and the second harmonic 19 exits through the resonator mirror 14.

The semiconductor laser 11 and the condenser lens 12 are fixed on a holder 20. The Nd:YAG crystal 13, the Brewster plate 15, KN crystal 16, etalon 17 and resonator mirror 14 are fixed on a separate holder (support) 21. The holders 20 and 21 are fixed on a base plate 22 and the base plate 22 is fixed on a Peltier element 24. The surface member of the holder 21 is made of copper, for example, and, as shown in FIGS. 2–4, the portion 21b corresponding to the middle portion of the mirror 14 adhered to the holder 21 is formed with a notch. The end face of the holder 21 to which the mirror 14 is attached is scored perpendicularly to the notch to form a mirror attachment surface 21a.

The Nd:YAG crystal 13, Brewster plate 15, KN crystal 16, etalon 17 and resonator mirror 14 constitute a resonator. This resonator section, the semiconductor laser 11 and the condenser lens 12 are maintained at a prescribed temperature by the Peltier element 24 under the control of a temperature-regulation circuit (not shown).

EXAMPLE 1

The mirror attachment surface 21a of the holder 21 was scored to form kerfs of 0.3 μm-depth at a pitch of 10 μm. The mirror attachment surface 21a was further ground in a fixed direction so as to make the size of the scoring burrs and the flatness 1 μm or less. The peripheral portion 14b of the resonator mirror 14 and the mirror attachment portion 21b were brought into close contact. The resonator mirror 14 was then adhered to the holder 21 by using capillarity to cause dripped adhesive to penetrate into the gap between the two in the directions indicated by arrows in FIG. 3. An epoxy adhesive of thermosetting was used. After the adhesive had penetrated between the attachment surfaces, the adhesive was allowed to harden by standing for 24 hours at room temperature and was then baked at 80° C. for 12 hours.

The thickness of the adhesive layer between the mirror attachment surface 21a and the resonator mirror 14 measured after baking was about 1–2 μm. The adhesive used in this example had a volumetric hardening contraction of 5–6%. Following storage tests conducted at between −25° C. and +70° C. after baking, the change in the thickness of the adhesive layers were found to be 0.1 μm or less.

The change in the resonator length (distance between the end face 13a of the Nd:YAG crystal 13 and the mirror surface 14a of the resonator mirror 14) produced by the observed changes in the thickness of the adhesive layers was 0.2 μm or less (not greater than ¼ the 946 nm wavelength of the solid state laser light). The wavelength change in this example was 0.01 nm or less.

EXAMPLE 2

Figure 5:
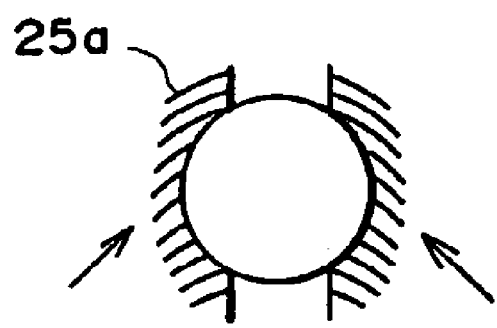
FIG. 5 is an enlarged plan view of a holder scored using a rotating blade.

Scoring was done using a rotary blade to impart a mirror attachment surface 25a with scoring as shown in FIG. 5. A semiconductor-laser-pumped solid state laser was fabricated in the same manner as in Example 1 except that penetration of adhesive was effected in the direction of the arrows shown in FIG. 5. Change in thickness of adhesive layers after baking and storage tests conducted between −25° C. and +70° C. was found to be 0.1 μm or less. The change in the resonator length (distance between the end face 13a of the Nd:YAG crystal 13 and the mirror surface 14a of the resonator mirror 14) produced by the observed changes in the thickness of the adhesive layers was 0.2 μm or less (not greater than ¼ the 946 nm wavelength of the solid state laser light).

COMPARATIVE EXAMPLE

A semiconductor-laser-pumped solid state laser was fabricated in the same manner as in Example 1 except that the mirror attachment surface 21a of the holder 21 was finished by ordinary milling. The thickness of the adhesive layer between the mirror attachment surface 21a and the resonator mirror 14 measured after baking was about 10 $\mu$m. Change in thickness of adhesive layers after baking and storage tests conducted between −25 C. and +70° C. was found to be about 0.3 $\mu$m (greater than ¼ the 946 nm wavelength of the solid state laser light).

Although this embodiment was explained regarding the fixing of the resonator mirror 14, the Nd:YAG crystal 13 is also adhered and fixed by the same method. While the invention was explained regarding an embodiment that uses a Nd:YAG crystal as the solid state laser and converts the solid state laser beam to its second harmonic, the invention can be applied with similar effect to semiconductor-laser-pumped solid state lasers that use other types of solid state laser crystals and, in particular, can be applied to a semiconductor-laser-pumped solid state laser that does not conduct wavelength conversion. Moreover, the invention can also achieve the same effect by using high-temperature molten solder instead of the adhesive used in Example 1 and 2.

What is claimed is:

1. An optical component fixing method using an adhesive to fix the optical component and a support on which the optical component is to be fixed at a prescribed location, the method comprising:
   a step of forming a notch in the support;
   a step of scoring a surface of the support so as to form kerfs communicating with the notch;
   a step of bringing the optical component into direct contact with the scored surface of the support; and
   a step of flowing a fluid adhesive along kerfs produced by the scoring,
   wherein the scoring kerfs are formed at a pitch of 3 $\mu$m–300 $\mu$m.

2. An optical component fixing method using an adhesive to fix the optical component and a support on which the optical component is to be fixed at a prescribed location, the method comprising:
   a step of forming a notch in the support;
   a step of scoring a surface of the support so as to form kerfs communicating with the notch;
   a step of bringing the optical component into direct contact with the scored surface of the support; and
   a step of flowing a fluid adhesive along kerfs produced by the scoring,
   wherein the scoring kerfs are formed to a depth of 0.1 $\mu$m–1 $\mu$m.

3. An optical component fixing method using an adhesive to fix the optical component and a support on which the optical component is to be fixed at a prescribed location, the method comprising:
   a step of forming a notch in the support;
   a step of scoring a surface of the support so as to form kerfs communicating with the notch;
   a step of bringing the optical component into direct contact with the scored surface of the support; and
   a step of flowing a fluid adhesive along kerfs produced by the scoring,
   wherein an attachment surface of the support has a flatness of 1 $\mu$m or less.

4. An optical component fixing method according to any one of claims 1 to 3, wherein the step of bringing the optical component into direct contact with the scored surface of the support further comprises bringing a solid state laser apparatus component into direct contact with the scored surface.

5. An optical component support to which an optical component is fixed with an adhesive, the support comprising a surface provided with a notch and scored kerfs communicating with the notch,
   wherein the scored kerfs are formed at a pitch of 3 $\mu$m–300 $\mu$m.

6. An optical component support to which an optical component is fixed with an adhesive, the support comprising a surface provided with a notch and scored kerfs communicating with the notch,
   wherein the scored kerfs are formed to a depth of 0.1 $\mu$m–1 $\mu$m.

7. An optical component support to which an optical component is fixed with an adhesive, the support comprising a surface provided with a notch and scored kerfs communicating with the notch,
   wherein an attachment surface of the support has a flatness of 1 $\mu$m or less.

8. An optical component fixing method using an adhesive to fix the optical component and a support on which the optical component is to be fixed at a prescribed location, the method comprising:
   a step of forming a notch in the support;
   a step of scoring a surface of the support so as to form kerfs communicating with the notch;
   a step of bringing the optical component into direct contact with the scored surface of the support; and
   a step of flowing a fluid adhesive along kerfs produced by the,scoring,
   wherein the scoring kerfs are formed at a pitch of 3 $\mu$m–300 $\mu$m, and
   wherein an attachment surface of the support has a flatness of 1 $\mu$m or less.

9. An optical component fixing method using an adhesive to fix the optical component and a support on which the optical component is to be fixed at a prescribed location, the method comprising:
   a step of forming a notch in the support;
   a step of scoring a surface of the support so as to form kerfs communicating with the nocth;
   a step of bringing the optical component into direct contact with the scored surface of the support; and
   a step of flowing a fluid adhesive along kerfs produced by the scoring,
   wherein the scoring kerts are formed to a depth of 0.1 $\mu$m–1 $\mu$m, and
   wherein an attachment surface of the support has a flatness of 1 $\mu$m or less.

* * * * *